(12) United States Patent
Pfeiffer

(10) Patent No.: US 9,108,345 B2
(45) Date of Patent: Aug. 18, 2015

(54) EXTRUDING DEVICE

(75) Inventor: Armin Pfeiffer, Celle (DE)

(73) Assignee: KRAUSSMAFFEI BERSTORFF GMBH, Hannover (DE)

(*) Notice: Subject to any disclaimer, the term of this patent is extended or adjusted under 35 U.S.C. 154(b) by 482 days.

(21) Appl. No.: 13/056,506

(22) PCT Filed: Jul. 29, 2009

(86) PCT No.: PCT/EP2009/059810
§ 371 (c)(1),
(2), (4) Date: Jan. 28, 2011

(87) PCT Pub. No.: WO2010/018062
PCT Pub. Date: Feb. 18, 2010

(65) Prior Publication Data
US 2011/0177189 A1 Jul. 21, 2011

(30) Foreign Application Priority Data
Aug. 13, 2008 (DE) .......... 10 2008 038 939

(51) Int. Cl.
B29C 47/38 (2006.01)
B29C 47/08 (2006.01)
B29C 47/36 (2006.01)
B29C 47/60 (2006.01)
B29C 47/00 (2006.01)

(52) U.S. Cl.
CPC .......... *B29C 47/0801* (2013.01); *B29C 47/082* (2013.01); *B29C 47/0803* (2013.01); *B29C 47/0818* (2013.01); *B29C 47/362* (2013.01); *B29C 47/6018* (2013.01); *B29C 47/6025* (2013.01); *B29C 47/0009* (2013.01)

(58) Field of Classification Search
CPC B29C 47/6025; B29C 47/60; B29C 47/6018; B29C 47/362; B29C 47/0818; B29C 47/082; B29C 47/0832; B29C 47/0801; B29C 47/0803; B29C 47/0805; B30B 11/241
USPC ..................................... 425/190, 190 R, 182
See application file for complete search history.

(56) References Cited

U.S. PATENT DOCUMENTS

| | | | |
|---|---|---|---|
| 2,090,434 A * | 8/1937 | Thalmann ........................ 366/78 |
| 3,795,456 A | 3/1974 | Schafer | |
| 4,192,616 A | 3/1980 | Spanier | |
| 5,011,396 A * | 4/1991 | Cosman et al. ............... 425/190 |
| 6,234,661 B1 | 5/2001 | Thewes | |
| 7,229,205 B2 | 6/2007 | Schunk et al. | |
| 2007/0166421 A1* | 7/2007 | Middelberg et al. .......... 425/209 |
| 2009/0238029 A1 | 9/2009 | Naoi et al. | |

FOREIGN PATENT DOCUMENTS

| | | |
|---|---|---|
| DE | 101 13 644 A1 | 9/2002 |
| DE | 103 20 599 A1 | 12/2004 |
| DE | 20 2007 000 475 | 4/2007 |
| JP | S54-15960 | 2/1979 |

(Continued)

*Primary Examiner* — Yogendra Gupta
*Assistant Examiner* — Ninh Le
(74) *Attorney, Agent, or Firm* — Henry M. Feiereisen LLC.

(57) ABSTRACT

An extruding device includes an extruder cylinder, a screw, and a rotary drive for the screw. To facilitate installation and removal of the assemblies of the extruding device, the screw end facing the rotary drive does not protrude during operation into bearings provided between the extruder cylinder and rotary drive, particularly not into a thrust bearing.

7 Claims, 2 Drawing Sheets

(56) References Cited

FOREIGN PATENT DOCUMENTS

| JP | S55-043526 | 3/1980 |
| JP | 59-123782 | 8/1984 |
| JP | S04-014411 | 1/1992 |
| JP | H07103377 | 4/1995 |
| JP | 4198189 | 12/2008 |
| WO | WO 96/06721 | 3/1996 |
| WO | WO 2008/012991 | 1/2008 |

* cited by examiner

EXTRUDING DEVICE

CROSS-REFERENCES TO RELATED APPLICATIONS

This application is the U.S. National Stage of International Application No. PCT/EP2009/059810, filed Jul. 29, 2009, which designated the United States and has been published as International Publication No. WO 2010/018062 and which claims the priority of German Patent Application, Serial No. 10 2008 038 939.0, filed Aug. 13, 2008, pursuant to 35 U.S.C. 119(a)-(d).

BACKGROUND OF THE INVENTION

The present invention relates to an extruding device with an extruder cylinder, a screw and a rotary drive for the screw. Advantageously, the extruding device can be used particularly with large single-screw extruders; however, the device may also be used with dual-screw or multi-screw extruders.

Large single-screw extruders can be employed, for example, in LDPE synthesis, meaning in the production of low-density polyethylene, wherein actual production rates can reach 60 tons/hours. Such facilities represent a very large capital investment and are designed with high target operating times in the range of 8000 hours/year. Any longer downtime represents a large economic loss for the operator. Disadvantageously, optionally installed upstream systems, such as crackers, may also have to be shut down when the device fails.

Extruders include typically an extruder cylinder, a screw and a rotary drive for the screw which is rotatably supported in an extruder cylinder. The screw is directly connected to the rotary drive for reliable and low-loss force transmission. The rotary drive may be constructed either with a direct drive or with a motor coupled by way of a gear. In addition, a thrust bearing may be required which absorbs forces resulting from the head pressure. This refers to the pressure exerted on the screw by the melt produced with the extruder. Such thrust bearings may either be integrated in the gear or in the direct drive, or may be provided separately. In the latter case, they are typically arranged between the rotary drive and the extruder cylinder.

In LDPE synthesis, in particular when performed with large single-screw extruders, rotary drives with a gear are typically employed which include various bearings and gear wheels. A thrust bearing, which is generally designed for a predetermined operating time, is arranged between the gear and the extruder cylinder. The operating time is typically in a range of 40,000 operating hours, which includes a statistic failure rate of about 10% for the bearings, i.e. bearings that fail before reaching the nominal operating time.

If a thrust bearing fails or if a gear experiences wear or fails, then the thrust bearing or the gear must be accessible so that the required repairs, for example replacing a gear bearing, can be performed. However, these repairs are quite complicated and can only be performed in multiple process steps.

First, the head end of the extruder must be opened. In an LDPE synthesis, which is typically granulated with a submerged granulator, the entire granulator must be disassembled and moved away from the extruder. The head connection between the extruder and the granulator must be disconnected, the flanges of the transport water loop of the submerged granulator must be opened, the electrical connection of the granulator motor must be disconnected, as well as the wiring of all sensors in the terminal box of the granulator. When the granulator has been axially moved away from the extruder cylinder, the next process step can be performed.

After the head connection of the extruder device has been opened, the screw can be pushed out through the region of the head connection towards the front. This is typically done from the site of the rotary drive through the gear and the thrust bearing, so that the drive-side screw end disengages from the region of the gear and the thrust bearing, i.e., it does no longer protrude into that region.

In particular when no separate shutoff valve for the material to be processed is installed in the extruder device in the region of the feed hopper, problems may arise with the material still remaining in the supply hopper and in the extruder cylinder. Because the material hereby comes into contact with a region of the screw which typically does not contact the material and then contaminates this region, malfunctions may occur later during operation.

When the screw end no longer protrudes into the region of the gear and the thrust bearing, an intermediate housing, which provides a connection between the thrust bearing and the extruder and which is generally divided along its center axis and hence can be opened, can be at least partially removed, so that thereafter the thrust bearing centrally mounted between the rotary drive and the intermediate housing can be removed. Only then can optionally also the gear housing be opened, allowing access to its components. If the malfunction occurs in the region of the thrust bearing, then the aforementioned process steps are also required in order to open the thrust bearing and reach the defective components.

It is therefore an object of the present invention to provide a simple and cost-effective structure which enables easy installation and removal of the individual components and assemblies of an extruding device.

SUMMARY OF THE INVENTION

According to the invention, an extruding device has an extruder cylinder, a screw and a rotary drive for the screw, wherein the screw end facing the rotary drive does not protrude into bearings disposed between the extruder cylinder and the rotary drive, particularly a thrust bearing. This structure has proven to be particularly advantageous because it prevents severe nesting of the individual assemblies and thereby results in a more modular configuration. For example, the individual assemblies, such as for example the rotary drive, extruder cylinder or bearings are more easily accessible. In particular, smaller extruding devices may be constructed entirely without interconnected bearings, so that according to the invention the screw then does not protrude into the region of the rotary drive, but the rotary drive-side screw end instead terminates essentially flush with the extruder cylinder or an optionally interconnected intermediate housing.

According to an advantageous embodiment, the extruding device according to the invention has a shaft, wherein one end of the shaft can be connected with a rotary force-transmitting element of the rotary drive and the other end with the screw end facing the rotary drive for transmission of the rotary force.

Interconnection of this shaft between the screw and the rotary drive increases the flexibility in constructing the extruding device. Advantageously, this can also be used during removal work.

Preferably, the rotary force-transmitting connections between the shaft and the screw as well as between the shaft and the rotary drive can be constructed for easy release. For example, if parts of the rotary drive and of an optionally interposed thrust bearing need to be removed, it will generally not be necessary to push out the screw, which may not be easy, because as a result of the interconnected shaft, the screw does not extend through all components arranged in the area between the extruder cylinder and the rotary drive. The rotary force are transmitted in this region by the shaft.

In a particularly preferred embodiment, the shaft can be positively and releasably connected with the rotary drive and/or with the screw end facing the rotary drive. A positive connection is particularly advantageous for transmitting a rotary force and can be constructed to be easily releasable, so that such connection can be released even after extended operating times.

Preferably, the shaft can be constructed so that both the rotary drive and the screw can be connected thereto via such positive and releasable connection. This reduces losses when transmitting the rotary force.

Advantageously, the shaft only passes through possibly interposed assemblies, such as bearings, without being supported by or connected to them. This further simplifies removal.

According to a particularly preferred embodiment, the screw end facing the rotary drive may have an opening with an interior tooth pattern for positive connection with the shaft. Such interior tooth pattern represents a particularly simple, releasable and positive rotary force-transmitting connection with a matching shaft having a mating exterior tooth pattern.

In an advantageous embodiment, the extruding device according to the invention is constructed such that the rotary force-transmitting element of the rotary drive does not protrude during operation into the extruder cylinder or possibly into bearings provided between the extruder cylinder and rotary drive, in particularly into a thrust bearing. In particular, the rotary force-transmitting element should terminate flush with the rotary drive or with a housing of the rotary drive. This further reduces undesirable nesting of the individual assemblies; the screw and the rotary force-transmitting element are connected by way of the shaft, which preferably is not supported by or in another element. Support is then provided by the rotary drive on one side and by the screw on the other side.

As rotary force-transmitting element, the rotary drive may advantageously have a hollow shaft, which can be open on the side opposite the extruder. In this case, the shaft may be constructed so as to be positively and releasably connectable with the hollow shaft of the rotary drive, preferably by way of a positive connection via an interior tooth pattern of the hollow shaft with an exterior tooth pattern of the shaft. The rotary force between the rotary drive and the shaft is here transmitted in the region of the rotary drive, thus providing a clear functional and positional association and preventing the assemblies from protruding into each other, with the exception of the shaft as a connecting member.

According to a particularly preferred embodiment, the rotary drive can be constructed such that the shaft, when released, can be pulled out of the rotary drive on the side opposite the extruder. The side opposite the extruder refers to the side facing away from the extruder cylinder. For example, if a malfunction occurs in the region of the rotary drive or an optionally interconnected thrust bearing or other interconnected components, then the connection between the rotary drive and the screw can be easily released and the shaft can be removed without requiring additional adaptation steps or removal steps. For this purpose, suitable tools may be provided which allow the shaft to be gripped when the rotary drive housing is being opened, so that the shaft can be pulled out, potentially after further unlocking. For example, a groove or the like, in which corresponding claws of the tool can engage, may be provided in the rotary drive-side of the shaft end.

To enable the shaft to be pulled out on the opposite side of the extruder after the release when the rotary force-transmitting element is embodied as a hollow shaft, the end of the shaft facing the screw must have a slightly smaller diameter than the hollow shaft of the rotary drive.

Is the screw end facing the rotary drive has an opening with an interior tooth pattern and the shaft a corresponding exterior tooth pattern, then the shaft can be readily pulled out through the hollow shaft of the rotary drive. For example, on one hand, both the hollow shaft and the opening of the screw end may have identical interior tooth patterns, with the exterior tooth pattern extending over the entire shaft length. On the other hand, the exterior tooth pattern may be interrupted between the shaft ends such that the diameter of the shaft in this region is smaller than the minimum diameter of the interior tooth pattern of the hollow shaft. Other embodiments, for example a slightly smaller diameter of the shaft in the region of the connection with the screw end facing the rotary drive, are also feasible.

According to a particularly advantageous embodiment, a thrust bearing may be provided between the extruder cylinder and the rotary drive for absorbing the axial pressure operating on the screw. The thrust bearing must absorb the large axial forces acting upon the screw, in particular with large extruders, so as to prevent damage to the rotary drive. These thrust bearings are designed for long operating times, but can cause long downtimes in the event of a failure, if they are not easily accessible. The thrust bearing may be connected with the extruder cylinder by way of an openable intermediate housing which also provides a centered connection between the thrust bearing and the extruder cylinder. A thrust piece which transfers the pressure from the rotary drive-side screw end to the thrust bearing may be rotatably supported in the thrust bearing. The shaft may hereby be loosely, i.e., without a fixed connection, pushed through the thrust piece, which simplifies removal.

As a result of the insignificant nesting of the assemblies according to the invention, the downtimes can be shortened. Because the screw does not protrude into the region of the thrust bearings, but terminates flush before the thrust bearing, for example flush with the intermediate housing, so that both the rotary drive and the thrust bearing are easily accessible without intervention in the region of the extruder cylinder with screw and feed and downstream devices. For example, the thrust bearing is readily accessible after removal of the shaft and optionally a part of the intermediate housing.

Preferably, the end of the rotary force-transmitting element facing the screw, in particular the hollow shaft, of the rotary drive also does not protrude into the thrust bearing during operation. The entire thrust bearing can now be more easily removed due to the corresponding construction of the rotary drive. The thrust bearing can be easily decoupled from the rotary drive by removing the shaft and by releasing connecting means. If the thrust bearing and the rotary drive are connected and centered with respect to each other, for example through matching projections and recesses, then the thrust bearing needs to move only slightly relative to the rotary drive in the axial direction before it can be removed, in particular sideways or upwardly. An optionally provided intermediate housing may also have to be removed. Since according to the invention the rotary force-transmitting element does not protrude farther into the region of the thrust bearing, only small relative axial movements are necessary which further simplifies removal.

According to another advantageous embodiment of the present invention, a flange may be provided in the extruding device, which is constructed to be separable and implement a centering connection between the thrust bearing and the rotary drive. The flange is preferably separable along its center axis, which is advantageously oriented horizontally. In this way, the region between the rotary drive and the thrust bearing is readily accessible form above, installation and removal are further simplified, and individual assemblies are easily and directly accessible. This has the additional advantage that the flange and optionally an intermediate housing provided between the thrust bearing and the extruder cylinder need not be completely removed in order to completely remove the thrust bearing or the rotary drive, but instead need only be suitably opened, so that the thrust bearing and the rotary drive can be removed upward, without an axial movement relative to another component. The stationary parts of the flange and the intermediate housing can stay connected at their respective location and, in particular, can stay connected with the adjoining component.

In a particularly preferred embodiment of the invention, the rotary drive is constructed as a motor with a gear or as a direct drive. The motor may embodied as hydraulic, electric or otherwise customary drives.

BRIEF DESCRIPTION OF THE DRAWING

A preferred embodiment of the invention will now be described in more detail with reference to the appended Figures, which show in.

DETAILED DESCRIPTION OF PREFERRED EMBODIMENTS

Figure 1:
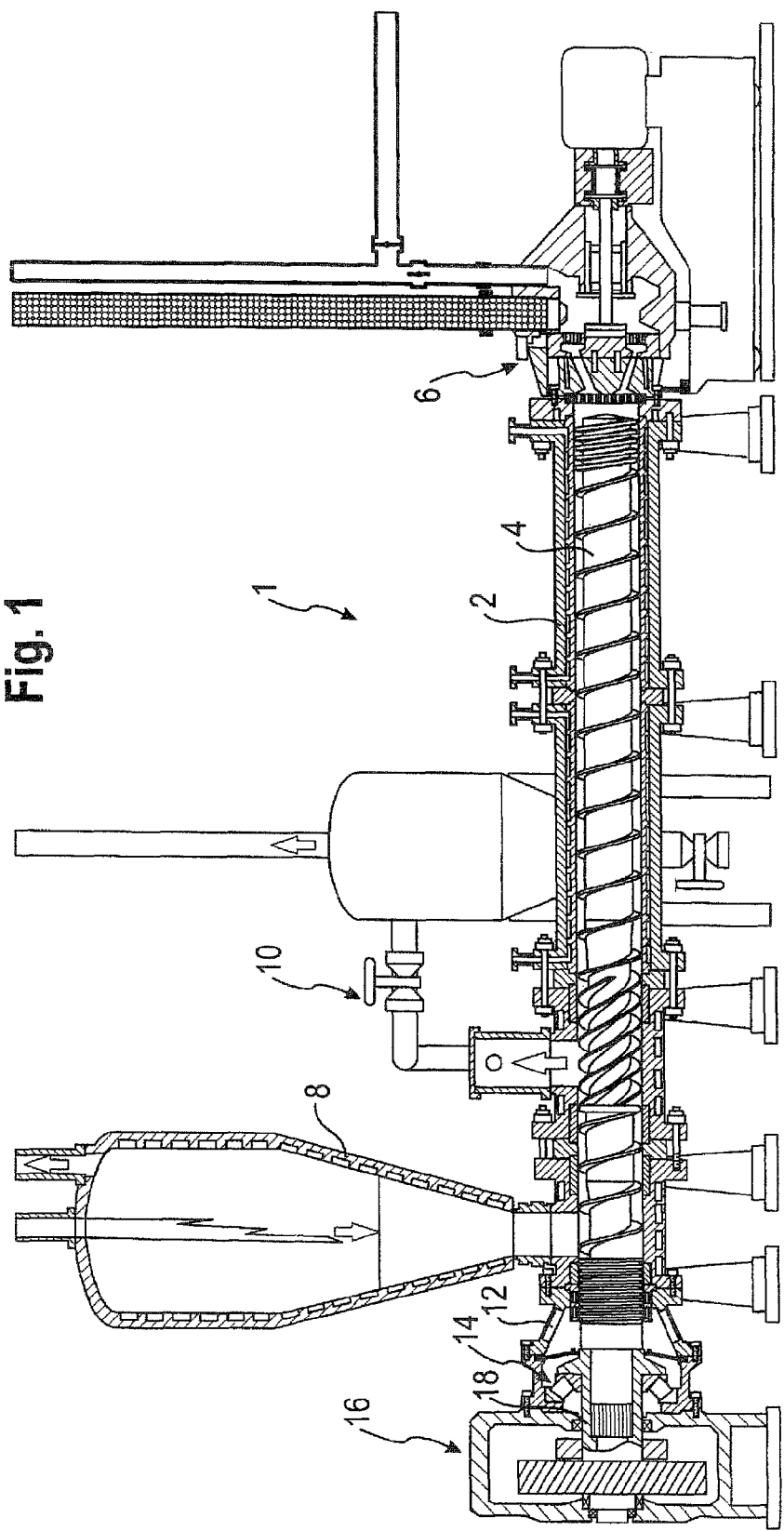
FIG. 1 a schematic diagram of a conventional extruding device for LDPE.

FIG. 1 shows a conventional single-screw extruding device of a type used for the synthesis of LDPE. The extruding device 1 includes an extruder cylinder 2 in which a screw 4 is rotatably supported. A granulating device 6 in form of a submerged granulator is connected to the head end of the extruder cylinder 2 by way of a perforated plate. In these submerged granulators, the melt is extruded into a water filled region through a perforated plate. Knifes rotate in front of the perforated plate and cut the extruded material into granulates which are cooled by the water and simultaneously transported away. These types of submerged granulators are conventional and will therefore not be described in detail.

The extruding device 1 is supplied with the material to be processed from a low-pressure separator 8, which can be closed off by a shutoff valve disposed at the inlet to the extruder cylinder 2. The material supplied to the extruder cylinder 2 in this way is degassed by a degasification device 10. Connected to the extruder cylinder 2 is on the left side an intermediate housing 12 which is constructed to be separable and which is used to connect a thrust bearing 14 and a gear 16 to the extruder cylinder 2. The housing of the thrust bearing 14 as well as the intermediate housing 12 and the housing of the gear 16 are constructed to be connectable in a centered manner. This is illustrated by corresponding engaging projections and recesses of the individual housings. The intermediate housing 12 is constructed to be separable, so that it can be opened first. The gear is driven by an unillustrated motor and transmits the torque to the screw 4, which is connected to the gear 16 via a hollow shaft 18 which protrudes into the region of the thrust bearing 14. The connection is established by way of a tooth pattern.

If maintenance is required or parts either of the gear 16 or the thrust bearing 14 need to be exchanged, then the screw 4 must first be moved to the right through the gear 16 and the thrust bearing 14 so that it no longer protrudes into the region of the thrust bearing 14. This is accomplished by removing the granulating device 6 disposed on the head end of the extruder cylinder 2 in several process steps; in particular, the water inlet and outlet lines must be disconnected, corresponding motors must be turned off and disconnected, and sensor connections must be disconnected.

After the connection between the head end and the granulating device 6 has been opened, the granulating device 6 can be moved—in FIG. 1 to the right. Only then can the screw 4 be pushed forward from the side of the gear 16 to the right through the extruder cylinder 2, until drive-side screw end 4" no longer protrudes into the region of the thrust bearing 14. Disadvantageously, the rotation-drive-side end 4" of the screw 4 can be contaminated by material still residing in the extruder cylinder 2, which may cause problems during subsequent installation.

Only after the screw 4 has been sufficiently pushed to the right can the thrust bearing 14 and optionally the gear 16 be accessed by opening the intermediate housing 12.

Figure 2:
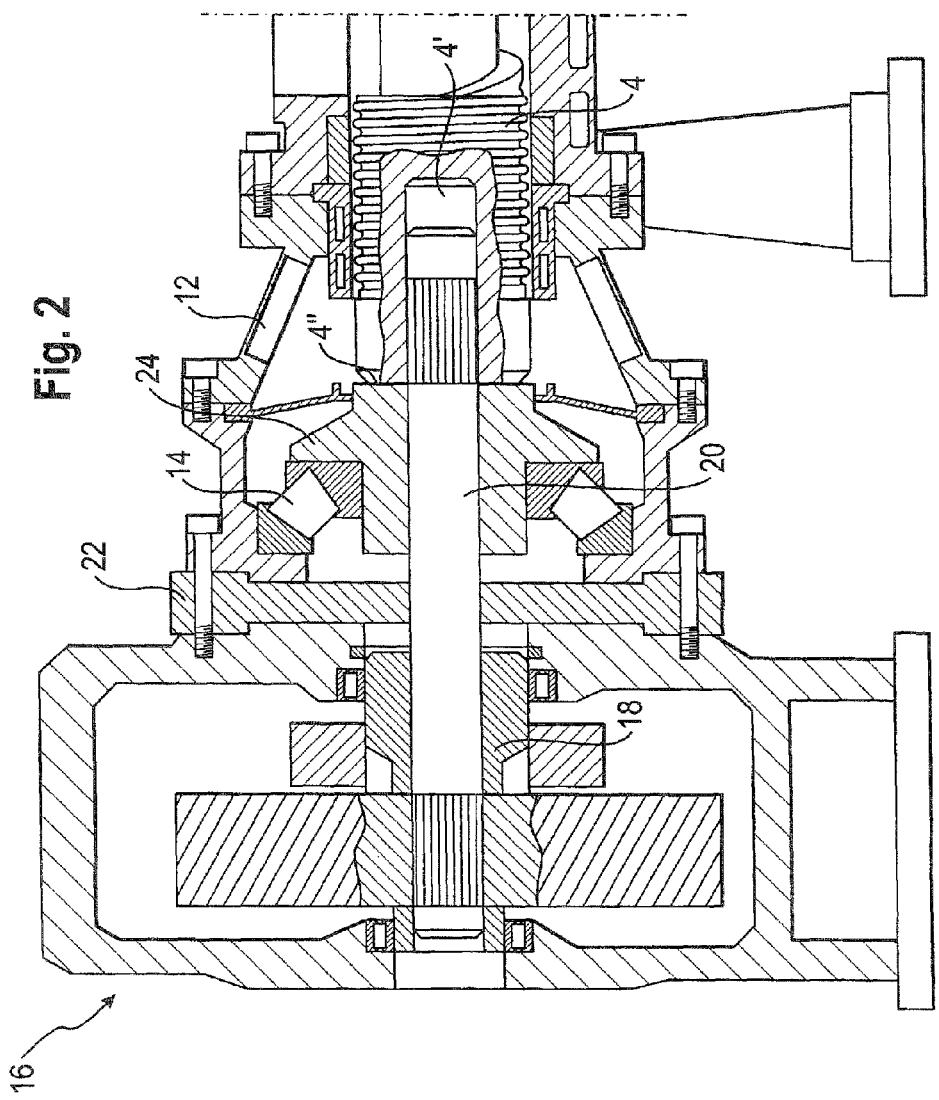
FIG. 2 a schematic diagram of a detail of an extruding device according to the invention in cross-section.

FIG. 2 shows a detail of the extruding device according to the invention in a cross-sectional view. Only the region between the rear end of the extruder cylinder 2 and the gear 16 is shown. According to the invention, the screw 4 is constructed so as not to protrude into the region of the thrust bearing 14. The rotary drive-side screw end 4" terminates in the region of and essentially flush with the intermediate housing 12. The rotary drive-side screw end 4" is supported on a thrust piece 24 which is rotatably supported in the thrust bearing 14 and transmits the pressure to the bearing. The shaft 20 passes through the thrust piece 24 without being connected therewith, so that it can be pulled out of the thrust piece 24 like out of a sleeve.

According to the invention, the gear 16 is also constructed such that the hollow shaft 18, by which the rotary force can be transmitted to the screw, does not protrude into the region of the gear housing, and more particularly not into the region of the thrust bearing 14. The connection between the hollow shaft 18 and the screw 4 is provided by a shaft 20 which has exterior tooth patterns on both ends. The exterior tooth patterns cooperate substantially positively with corresponding interior thread patterns of the hollow shaft 18 and of an opening 4' in the drive-side screw end 4". The gear 16, the hollow shaft 18 of the gear 16, and the shaft 20 are constructed such that the shaft 20 can be pulled out on the side opposite the extruder, in FIG. 2 towards the left. If maintenance is required in the region of the thrust bearing 14 or the gear 16, the shaft 20 can then be easily pulled out through the gear 16 to the left, without causing a relative displacement of the screw 4.

Additionally, a flange 22 may be provided which is preferably separable along its center axis, to establish a connection between the housing of the gear 16 and the housing of the thrust bearing 14. The flange 22 and the housing are centered with respect to each other. This can be attained with corresponding projections and undercuts disposed both in the housings and on the flange 22.

With the structure according to the invention, the shaft 20 can be pulled out through the gear 16 in FIG. 2 to the left for maintenance or when a gear component or a component of the thrust bearing 14 are exchanged. The intermediate housing 12 can then be separated from the extruder cylinder 2 and the thrust bearing 14 at least on one side and opened, allowing access already to a part of the thrust bearing. If additional measures are required, then the flange 22 can be opened by releasing the connection between the thrust bearing 14 and the gear 16, so that the thrust bearing 14 then can be removed upwardly. Alternatively, if malfunctions occur only in the region of the gear 16, the connection between the thrust bearing 14 and the gear 16 can be released via the flange 22, the flange can be opened and the gear 16 can be opened and disassembled or optionally lifted out upwardly in its entirety.

Because according to the invention a shaft 20 is provided as an element transmitting the rotary force, nesting of the different components is relatively insignificant as a result. This simplifies installation and removal of the individual components. This is particularly the case in a situation where neither the rotary drive nor the screw 4 includes elements which protrude into another component.

With this structure, a rotary drive and in particular a gear 16 and/or a thrust bearing 14 can be easily serviced and optionally removed, without requiring additional modifications on the extruding device 1, in particular in the region of the extruder cylinder 2 and the screw 4. For example, the head end of the extruder, including optional downstream systems, such as a granulating divides 6, can then remain unchanged.

With the present invention, installation times during malfunction of bearings or gear components can be significantly reduced. In LDPE synthesis, the downtime can be reduced to be in a range of 4-6 shifts, which would prevent production losses of 2-3 million euros. Because LDPE synthesis facilities operate over many years without substantial repair measures, unplanned installation work poses an increased risk for unanticipated delays. Because with the structure of the extruding device according to the invention the required process steps are reduced even in the event of unplanned removal and installation work, the risk of unanticipated downtimes is reduced.

With the extruding device according to the invention, technicians trained for extruders as well as gears were required until now for removal work on extruding devices when the rotary drive and potentially the thrust bearing were affected, because the work on the rotary drive and/or on the thrust bearing also required complicated modifications on the extruding side. With the embodiment of the invention, only one technician for the thrust bearing and the gear or the drive is required. This results in additional savings and increased availability of the facility for the customer.

The invention claimed is:

1. An extruding device comprising:
    an extruder cylinder,
    a screw disposed in the extruder cylinder for rotation, said screw having one end with a central bore constructed as a blind hole and a thrust bearing end face,
    a rotary drive facing the one end of the screw and having a rotary force-transmitting element with a center bore,
    a thrust bearing arranged between the rotary drive and the one end of the screw and bearing against the thrust bearing end face, and
    a shaft passing through a central through-opening of the thrust bearing and having a first end with an exterior tooth pattern constructed for engagement with an interior tooth pattern of the rotary force-transmitting element to form a first spline connection, and a second end with an exterior tooth pattern constructed for engagement with an interior tooth pattern of the central bore of the screw to form a second spline connection, wherein the shaft maintains alignment between the central bore of the one end of the screw and the center bore of the rotary force-transmitting element and transmits a torque of the rotary force-transmitting element to the screw,
    wherein the shaft is constructed to be pulled out of the rotary drive in an axial direction through the center bore of the rotary force-transmitting element by a linear motion without rotation on a side of the rotary drive facing away from the one end of the screw wherein an entirety of the rotary force-transmitting element of the rotary drive is constructed so as not to protrude during operation into the thrust bearing.

2. The extruding device of claim 1, wherein the first end of the shaft is connected positively and releasably to the rotary force-transmitting element of the rotary drive or the second end of the shaft is connected positively and releasably to the one end of the screw, or both ends of the shaft are positively and releasably connected.

3. The extruding device of claim 1, wherein the rotary force-transmitting element of the rotary drive is constructed so as not to protrude during operation into the extruder cylinder.

4. The extruding device of claim 1, wherein the rotary force-transmitting element of the rotary drive is formed as a hollow shaft.

5. The extruding device of claim 1, wherein the thrust bearing absorbs axial pressure operating on the screw.

6. The extruding device of claim 5, further comprising a flange which is constructed to be separable and to realize a centering connection between the thrust bearing and the rotary drive.

7. The extruding device of claim 1, wherein the rotary drive is constructed as a motor with a gear or as a direct drive.

* * * * *